No. 774,024. PATENTED NOV. 1, 1904.
O. S. ANDERSON.
ELEVATOR ATTACHMENT FOR FARM WAGONS.
APPLICATION FILED MAR. 4, 1904.
NO MODEL. 2 SHEETS—SHEET 2.
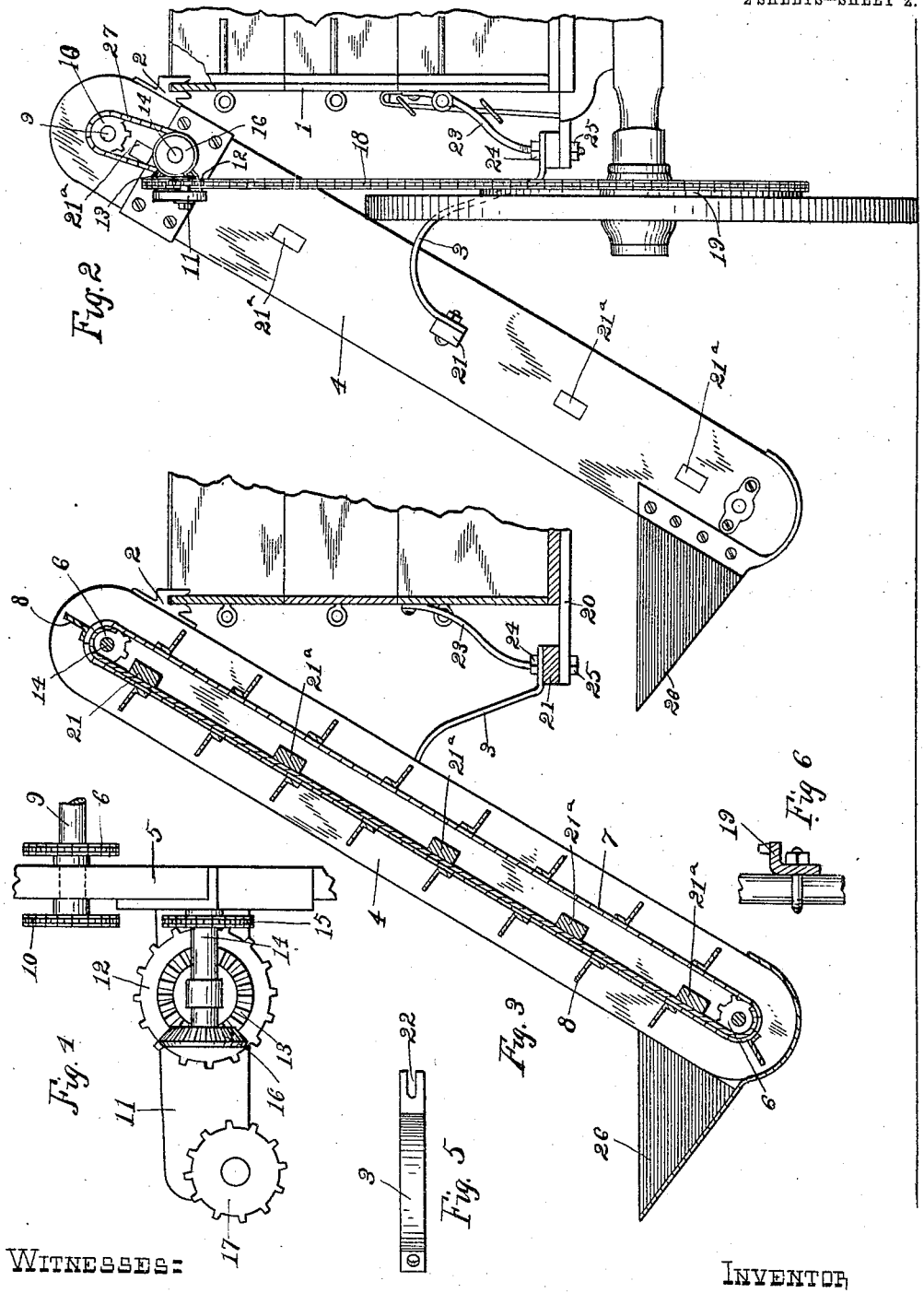
WITNESSES:
R. E. Hamilton.
J. W. Garrison.
INVENTOR
Otto S. Anderson
By Hiden & Hiden Attys No. 774,024.               Patented November 1, 1904.

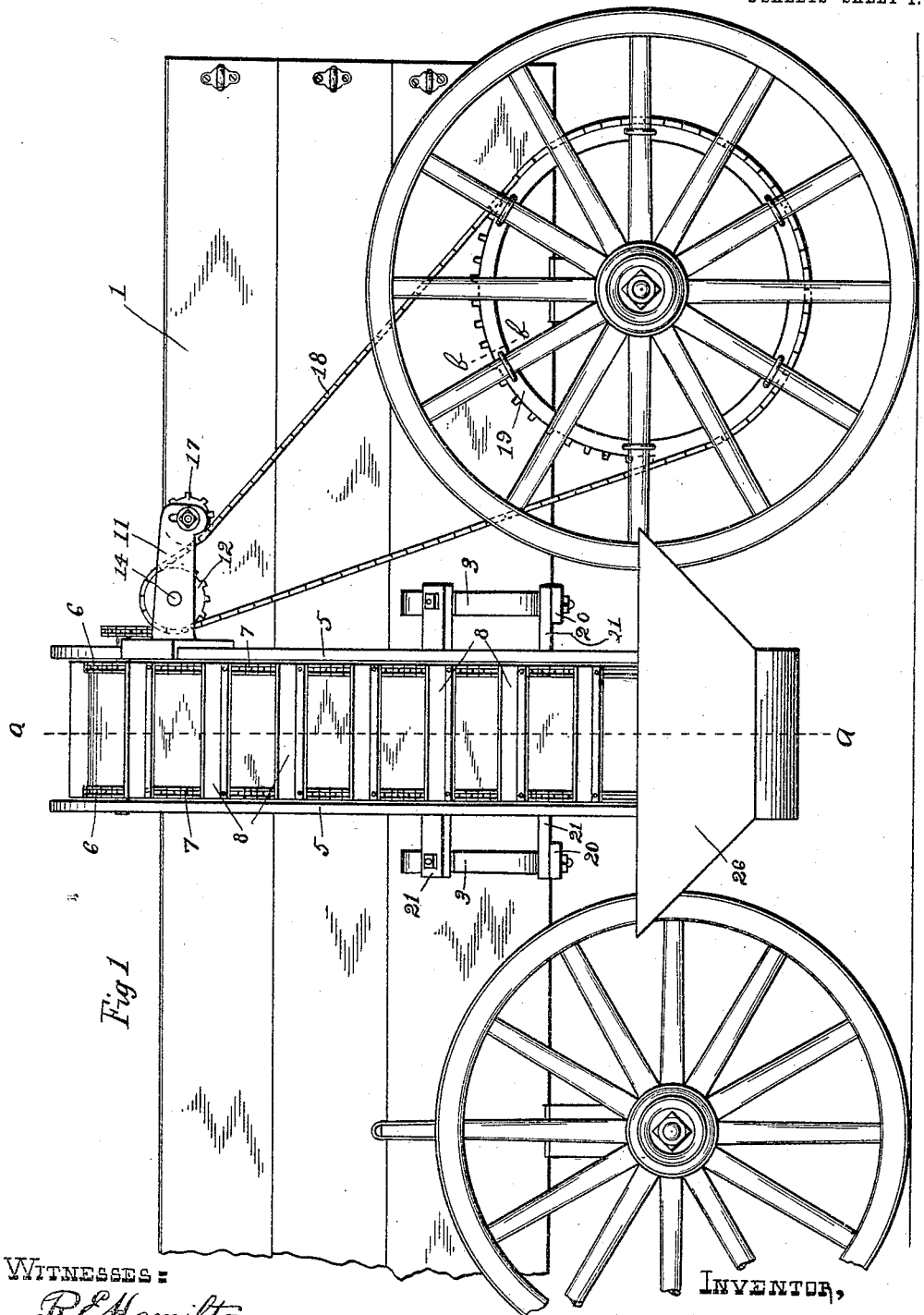

UNITED STATES PATENT OFFICE.

OTTO S. ANDERSON, OF KANSAS CITY, MISSOURI.

ELEVATOR ATTACHMENT FOR FARM-WAGONS.

SPECIFICATION forming part of Letters Patent No. 774,024, dated November 1, 1904.

Application filed March 4, 1904. Serial No. 196,504. (No model.)

*To all whom it may concern:*

Be it known that I, OTTO S. ANDERSON, a citizen of the United States, and a resident of Kansas City, in the county of Jackson and State of Missouri, have invented new and useful Improvements in Elevator Attachments for Farm-Wagons, of which the following is a specification.

My invention relates to a device to be attached to farm-wagons; and the object of my invention is to expedite the loading of corn in the husk or with the husk taken off while gathering the corn from the standing stalks in the corn-field, and it is also applicable for gathering fallen apples from the orchard and gathering potatoes from the potato-field.

My invention may also be used with good effect in cleaning the streets in a city, as the loose dirt can readily be shoveled into the hopper and elevated into the wagon-box, and may also be used with good effect in removing the earth in excavating and similar purposes.

Referring to the accompanying drawings, Figure 1 is a side elevation of a wagon with my invention in position to the wagon ready for use. Fig. 2 is a broken elevation of my invention looking at it from the rear of the wagon. Fig. 3 is a sectional elevation of the attachment, taken on line $a\ a$ of Fig. 1. Fig. 4 is a top section of Fig. 1, disclosing means for extending the elevation of the product sufficiently above the top of the wagon-box so that it will discharge in the box, which will be fully described. Fig. 5 is a top plan view of a curved brace or support which is adapted to assist in holding my invention to the wagon-box. Fig. 6 is a detailed view of a section of one of the wagon-spokes and a cross-section of a sprocket-rim, taken on line $b\ b$ of Fig. 1, secured to the spoke. Said sprocket-rim and the manner of securing it to the wagon-wheel are clearly indicated in Fig. 1.

With the above description I will now proceed to more fully describe my invention by referring to corresponding numerals on the drawings, and the specification, in which—

1 designates a wagon-box in position on the running-gear of a wagon. Mounted to said wagon-box by means of a pair of brackets 2 and a pair of braces 3 is an elevator 4. Said elevator consists of two sides 5 and horizontal shafts mounted in the upper and lower ends thereof. Said shafts are provided with sprocket-wheels 6 at each end. Supported on and carried by said sprocket-wheels are a pair of sprocket-chains. Secured to said sprocket-chains in a suitable manner is an endless apron 7, and secured to said endless apron is a series of longitudinal flights or carriers 8.

One end of the horizontal shaft at the upper end of the elevator, which I will designate 9, extends outwardly through one of the sides 5 of the elevator-frame a sufficient distance to receive a sprocket-wheel 10.

A short distance below the top of the elevator-frame 4, rigidly secured thereto, is a bracket 11. To said bracket 11 is mounted a sprocket-wheel 12. Said sprocket-wheel 12 is provided with a bevel-wheel 13, and horizontally supported by said bracket 11 is a shaft 14. Mounted on one end of said shaft is a bevel-wheel 16. Said bevel-wheel 16 is adapted to mesh with the bevel-wheel 13. On the outer end of said bracket is a lag sprocket-pulley 17. Said pulley is adapted to give proper tension to the main sprocket driving-chain 18. Said driving-chain is adapted to transmit power from a sprocket-rim 19, secured to one of the wagon-wheels, to a sprocket-wheel 12, which is supported by the bracket 11.

Secured to the under side of the wagon-box is a pair of brackets 20. The ends of said brackets extend outwardly a sufficient distance to receive a cross-beam 21. Resting upon said cross-beam are brackets or supports 3, already referred to. Said supports are provided with slots 22, as seen at Fig. 5, in their lower ends. For supporting the floor of the elevators I have provided cross-beams 21ª, their ends extending through the sides thereof, as shown. I have further provided a pair of bracket or supports 23. Their upper ends are secured to the wagon-box, and their lower ends pass through the outer ends of cross-beams 21 and are secured thereto, with nuts 24 and 26 binding the slotted ends 22 of the supports 3 to the ends of said cross-beams 21. The object of said slots 22 in the lower ends of supports 3 is to admit of the elevators being adjusted to the proper position for elevating the product into the wagon-box. I have further provided at the lower end of my elevators a hopper 26. The product to be elevated into the wagon-box is first cast into said hopper, where it will readily come in engagement with the moving flights or carriers 8, which will carry the same to the top of the elevators and toss it into a wagon-box.

The object in making an additional gearing at the top of my elevators is to cause them to carry the product in the right direction to be dumped into the wagon-box. In order to accomplish this, it was necessary to provide a short sprocket-chain 27, communicating between sprocket-wheel 10 and sprocket-wheel 15.

The operation and utility of my invention are as follows: The wagon is driven into the corn-field, and the corn is snapped from the cornstalks and tossed into the hopper 26. At intervals the team is moved forward, and the corn accumulated in the hopper is carried up by the elevators and tossed into the wagon-box. The operation and movements are the same in gathering apples from the orchard or potatoes from the potato-field.

Having now fully described my invention, what I claim, and desire to secure by Letters Patent of the United States, is—

1. In an elevator attachment for farm-wagons, of the character described, the combination of a wagon-box, extending brackets secured to the under side of the box, a cross-beam, supported on the brackets, an elevator-frame mounted to the side of a wagon, a pair of sustaining-brackets, one end secured to said cross-beam, the opposite ends secured to the elevator-frame, elevating-apron and elevator-flights, supported in the elevator-frame, and means for causing rotation, substantially as described.

2. In an elevator attachment for farm-wagons, of the character described, the combination of a wagon-box, extending brackets secured to the under side of the box, a cross-beam supported on the brackets, a pair of supporting-brackets, supported on the cross-beam, an elevator-frame, a hopper, supported on said frame, an endless belt carrying elevating-flights, supported on the inside of the frame, and means for causing the elevation of the endless belt and the buckets, substantially as described.

3. In an elevator attachment for farm-wagons, of the character described, the combination of a wagon-box and an elevator, brackets secured to the upper ends of the elevator mounted to the box-frame, and adapted to engage the top of the wagon-box, a bracket secured to the outside of the elevator-frame, sprocket-wheels and a bevel-gear, supported by said bracket, and means communicating from the running-gear of the wagon to one of the sprocket-wheels, carried by said bracket, and means for transmitting power to the elevating-flights, substantially as described.

4. In an elevator attachment for farm-wagons, of the character described, the combination of a wagon-box, an elevator-frame, mounted to the box, a bracket mounted to said frame, a sprocket-wheel carried by said bracket and a sprocket-chain adapted to transmit power from the running-gear of the wagon to said sprocket-wheel, a sprocket-chain 27, adapted to transmit power from sprocket-wheel 15, to sprocket-wheel 10, and means for producing the movements of the elevator, substantially as described.

In testimony whereof I affix my signature in the presence of two witnesses.

OTTO S. ANDERSON.

Witnesses:
JOSEPHINE W. GARRISON,
W. E. LIVEZEY.